June 23, 1970     M. SMIT     3,516,466

SPIKED TIRES FOR AUTOMOTIVE VEHICLES

Filed Jan. 29, 1968     4 Sheets-Sheet 1

INVENTOR:
MICHAEL SMIT

BY
*Otto John Munz*
ATTORNEY

June 23, 1970   M. SMIT   3,516,466
SPIKED TIRES FOR AUTOMOTIVE VEHICLES
Filed Jan. 29, 1968   4 Sheets-Sheet 3

INVENTOR:
MICHAEL SMIT
BY
ATTORNEY

United States Patent Office 3,516,466
Patented June 23, 1970

3,516,466
SPIKED TIRES FOR AUTOMOTIVE VEHICLES
Michael Smit, 70 Buecklestrasse, 7750 Constance
(Bodensee), Germany
Filed Jan. 29, 1968, Ser. No. 701,296
Claims priority, application Germany, Jan. 30, 1967,
S 108,075; May 24, 1967, S 110,003
Int. Cl. B60c 11/16
U.S. Cl. 152—208                                 7 Claims

ABSTRACT OF THE DISCLOSURE

An automobile tire with retractable spikes has each spike located in a hole in the tread of the tire. The spike has a head fastened to a band inside the tire, and inflation of a tube of which the band forms part, retracts the spikes into the tread. Deflation of the tube causes the spikes to protrude from the tread.

---

The invention concerns a spiked tire for automotive vehicles, the hard metal tips of the spikes being embedded in sleeves made of a softer metal.

Two methods are known for fixing the spikes in the tires the first is to vulcanise them in place when producing the tire, and the second to insert them into the tread of the completed tire. In both embodiments the spikes, once secured, remain immovably in their bed.

This is a disadvantage, since a spiked tire is required only to give safe driving in ice and frozen snow conditions. When the road is dry, or wetted only by rain, the spiked tire not only makes driving less easy, but also causes damage to the road surface. For light snow or slush the spikes are ineffective.

This means that in the winter months the average driver after fitting spiked tires, drives for 95% of his distance under a disadvantage, in order to be secured on the remaining 5% of icy roads. If spiked tires were to be fitted only for icy roads, this would necessitate a constant change of tires.

The object of the invention is to provide a tire which can be rapidly and easily converted from a spiked to a nonspiked form and vice versa.

According to the invention the spikes of a tire are mounted so as to slide to and fro in radial passages in the tread of the tire, and the bases of the spikes are retained by at least one ring adapted to be radially expanded and contracted and arranged concentrically in the interior, and independently, of the tire.

Figure 1:
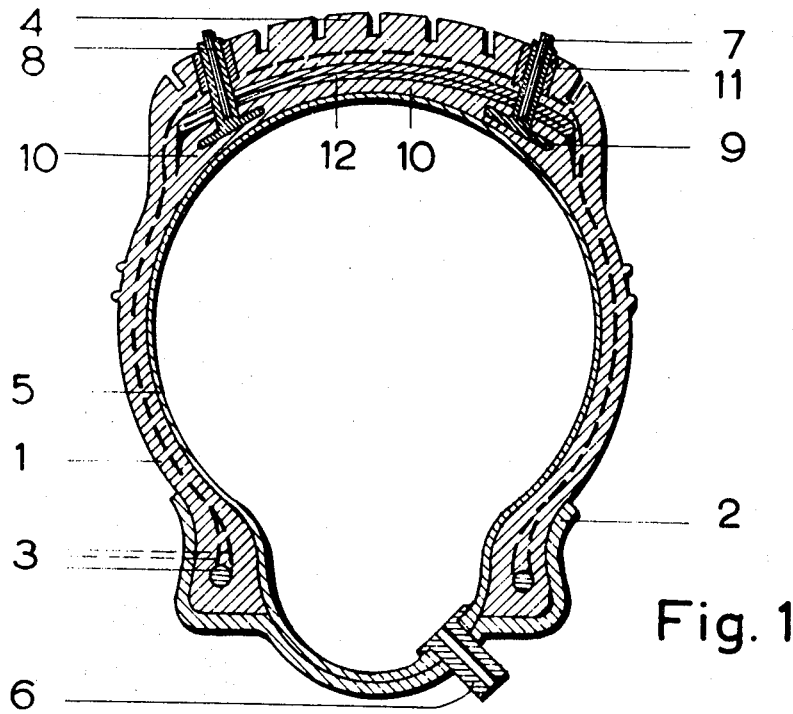
Figure 2:
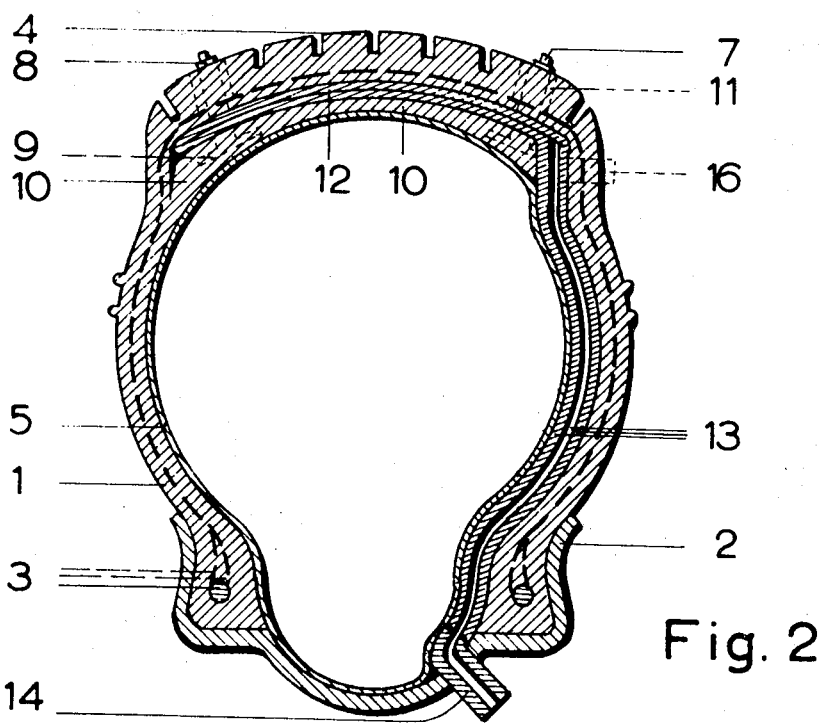
Figure 3:
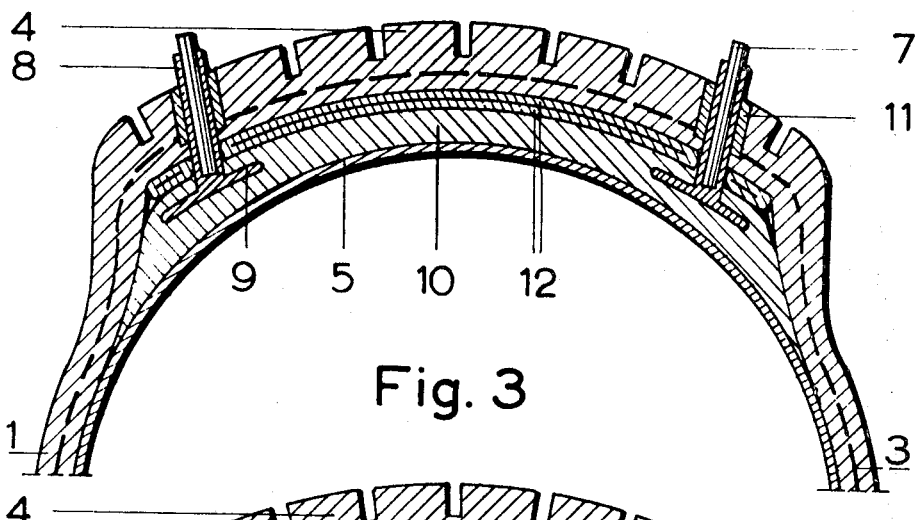
Figure 4:
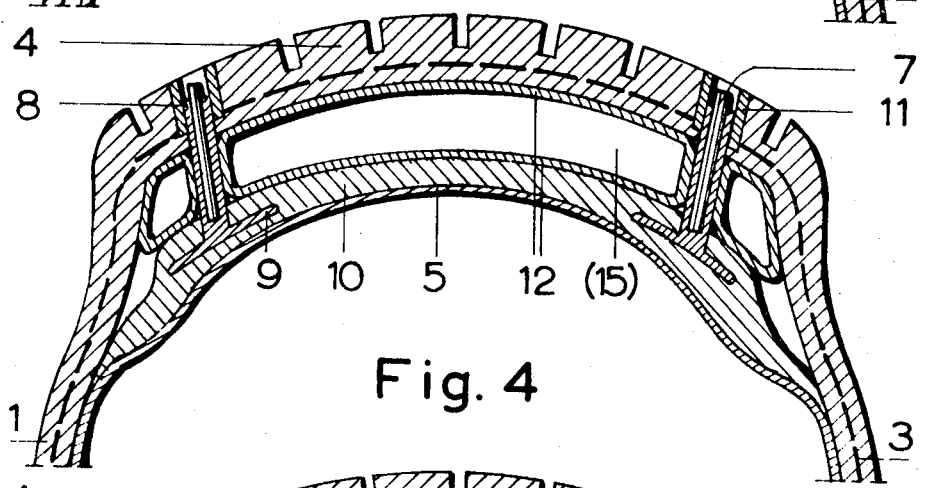
Figure 5:
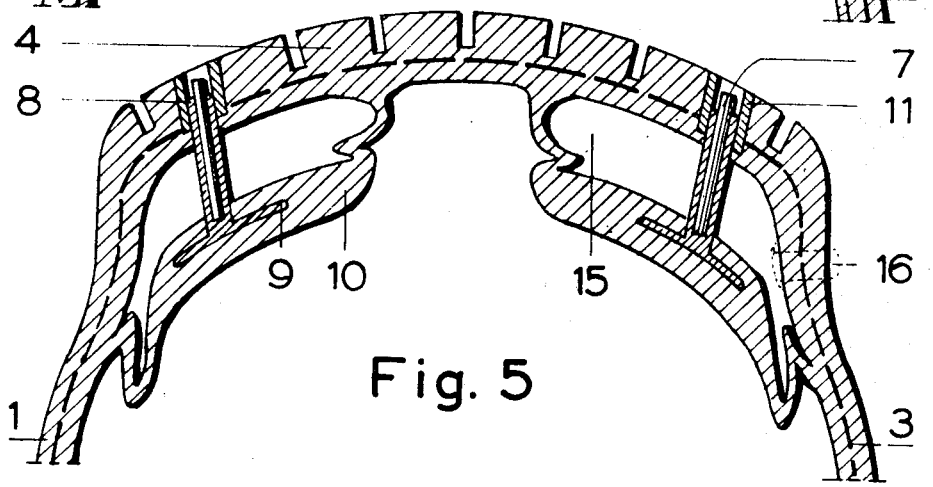
Figure 7:
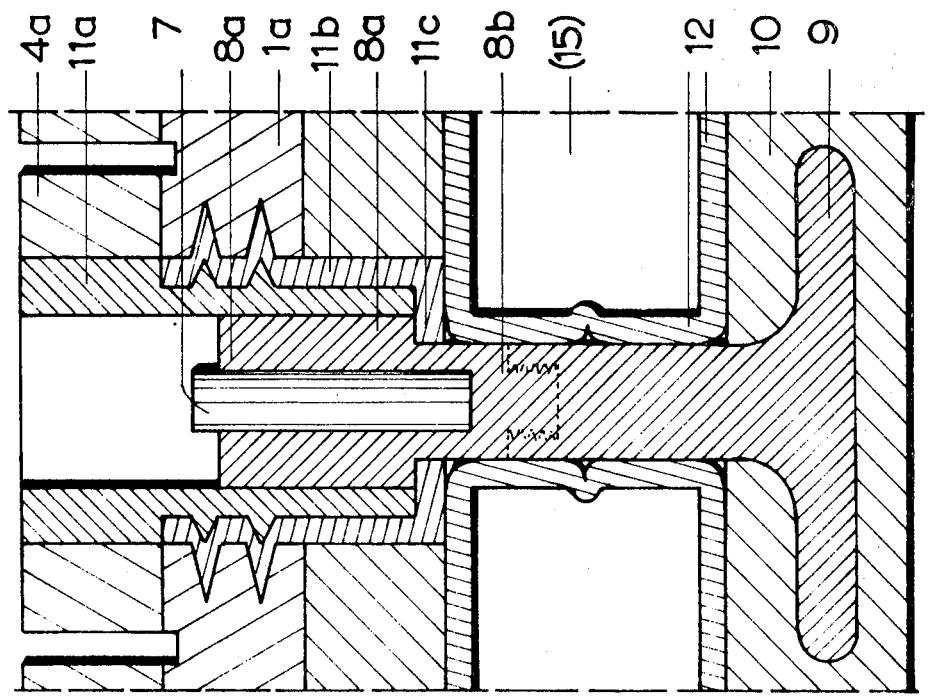
Figure 6:
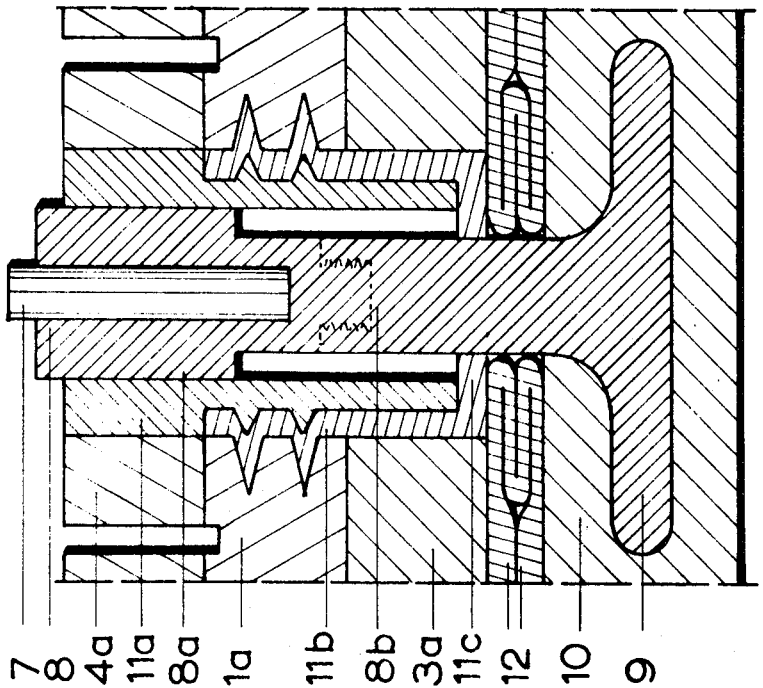
Figure 8:
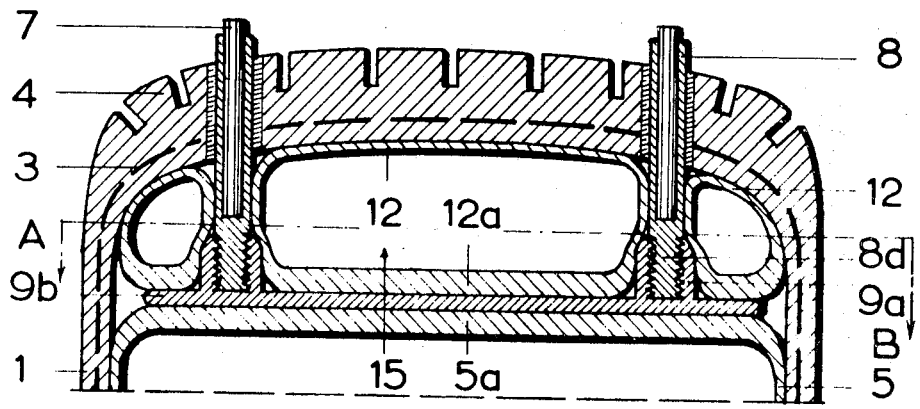
Figure 9:
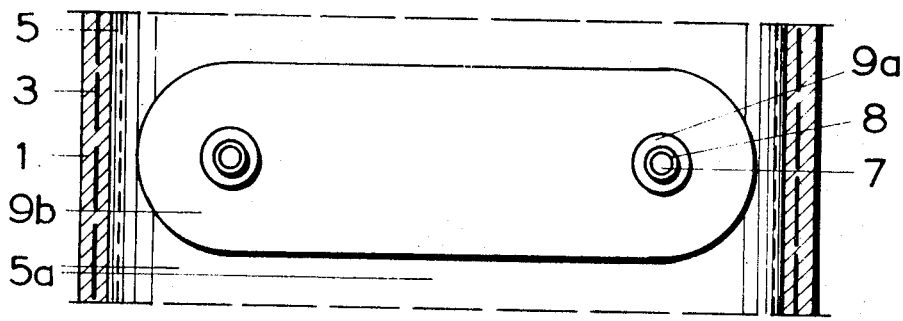
Figure 10:
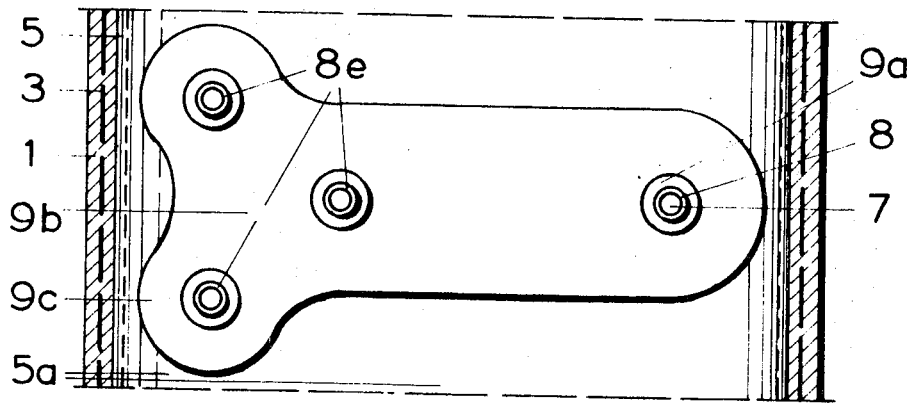

Reference should now be made to the accompanying drawings, in which:

FIG. 1 is a cross-section through a pneumatic tire in accordance with the invention, at the normal tire valve, FIG. 2 is a cross-section as in FIG. 1 but at the place of an additional valve for the spike control, FIG. 3 is an enlarged fragmentary section of FIG. 1 with extended spikes, FIG. 4 is the same fragmentary section as FIG. 3, but with the spikes retracted, FIG. 5 is an alternative form of tire to FIG. 4, FIG. 6 is a detailed section of the extended spikes, FIG. 7 is the same detail in the retracted state, FIG. 8 is a partial cross-section through an alternative embodiment, FIG. 9 is a section on the line A–B in FIG. 8, and FIG. 10 is an alternative to FIG. 9.

Referring to FIG. 1, a tire in accordance with the invention is denoted by 1 and is fitted in the conventional way on a rim 2 and provided with wire inserts 3. Its surface 4 normally has a winter tread profile, but may also be provided with a summer tread. It may be tubeless or provided with a tube 5, a valve 6 of which protrudes diagonally from the rim 2. Spikes are provided, each consisting of a hard metal pin 7 which is enclosed in a sleeve 8 made of softer metal.

The feet 9 of these sleeves 8 are held in position by a ring 10 which is resilient and as shown is approximately equal in width with the tread 4, and is supported from the side of the tire against it. The sleeves 8 pass through passages 4 in the tread, lined with bushes 11. These bushes 11 are preferably made of a material which has the same resistance to abrasion as the tread 4 but do not develop must heat.

If the ring 10 is now retracted towards the inside, of the tire the spikes 7, 8 in the bushes 11 slide inwardly and so disappear from the tread surface. This process is caused by air pressure; the gap between the ring 10 and the inside of the tread is formed as an air chamber which may be inflated, and is provided with a valve accessible from the outside.

In FIGS. 1 and 2 this embodiment is shown in connection with a tubed tire. In FIG. 1 the spikes 7, 8 and the valve 6 of the main tube 5 are in section, while the section of FIG. 2 passes through the chamber tube 12 and its pressurec onduit 13 which is led down laterally to the rim 2 where, offset relative to the main valve 6, it terminates in an additional valve 14. The chamber valve could of course, as a separate valve 16 of suitable structure, be located laterally in the tire itself, as shown in broken lines in FIGS. 2 and 5.

FIGS. 3 and 4 show the embodiment with the two spikes at extreme positions, in which the ring 10 is separate from the tire 1, 3, 4 and made of substantially the same material as the tire. It may be additionally braced by elastic or rigid cross ribs, plates or the like.

The chamber tube 12 may have an aperture for each spike or it may be assembled from three multiply interconnected tube rings. In each case it is endless and inflatable, the pressure acting inwards, since the tire 1, 4 is prevented from expanding by its inserts 3. The same pressure normally prevails in the chamber as in the tire. Therefore, if with the spikes extended as shown in FIG. 3 the chamber tube is subject to further pressure, then the pressure of the whole tire increases. Since the volume of the chamber tube however, is relatively small, the pressure increase is only slight; this can be compensated by releasing air from the main tube 5, should this be necessary.

In the embodiment shown in FIG. 5 two parallel, annular chambers 15 are provided which may be individually inflated and thereby permit an asymmetric spike extension.

The ring 10 fitted with spikes, after slipping the chamber tube 12 thereover, is inserted in the tire 1, 3, 4 which is provided with passages and bushes 11. For this purpose the tire can be sufficiently expanded to enable the spike tips to be inserted into the passages. Thus the ring 10 is immovably mounted owing to the spikes extending radially outwards. It may now be loosely supported and pressed outwardly by the tube 5 as shown in FIGS. 3 and 4. It may, however, as shown in FIGS. 1 and 2, be vulcanized to the edges of the tire, which will be the case with a tubeless tire.

Finally, if the spikes 7, 8 are sealed to the bushes 11 the chamber tube 12 may be abandoned, and the chamber made tubeless, whereby either the pressure conduit arranged in the interior of the tire is led to a valve 14 at the rim 2, or the valve 16 already mentioned is directly mounted in the side of the tire.

More particularly in connection with the tubeless embodiment (shown in FIG. 5 with two individual chambers 15) it is essential for the ring 10 to be thick and rigid in the region of the spike bases 9, but towards the sides it must be thin and possibly folded or pleated, so that the spikes have a solid location, but their basis must be easily moved by the air chambers 15.

The ring 10 is so dimensioned and located that it reaches its maximum expandibility before the spikes, retract their tips out of the bushes 11, so as to prevent the spikes from accidentally slipping out of their guide and thereby making the whole tire useless, or at least necessitating a repair. In order to eliminate this danger and at the same time to take the changing conditions of wear of the tire made in accordance with the invention, a spike embodiment as shown in FIGS. 6 and 7 is advantageous.

In known spiked tires the location, choice of material and the dimensioning are so adapted to one another that the tread strip 4 and the spikes wear at the same rate, so that the latter always project beyond the tread surface by a constant amount irrespective of wear. A tire in accordance with the invention is used only for a small part of its life with spikes, and mainly with retracted spikes. As a result the tread strip 4 wears quicker than the spikes.

In FIGS. 6 and 7 the tire thickness is divided into three regions, the wear layer 4a, the intermediate structure 1a and the reinforced carcass 3a. According to this embodiment the bush is composed of two parts, namely a wear part 11a made of plastics material, ceramics or the like, which in the region of the wear layer 4a is of maximum diameter, but lower it is of reduced diameter, and fitted into a locating part 11b. The latter in turn is rigidly located in the intermediate structure 1a or in the carcass 3a and merges at its lower end into an inside flange 11c. The spike sleeve is stepped, with the head 8a corresponding accurately with the inner dimension of the bush 11a and slidingly engaged with suction therein. The shaft 8b has a diameter equal to that of the diameter of the inside flange 11c. The height of the head 8a is so dimensioned that in the retracted state (as shown in FIG. 7) it is supported on the inside flange, when the new spike tip still assumes a position below the wear limit. In the extended position the head 8a even with a tread strip worn to the limit, still has a short length engaging in the bush 11a, thus being prevented from slipping out upwardly.

This embodimnet has the advantage that the spike is prevented from inadvertently slipping inwards even if faulty location of the ring makes this possible. Again, the spikes can be optionally extended to a greater or lesser extent or completely retracted with every degree of wear of the tread strip 4, 4a.

Finally, it is advantageous to divide the shaft 8b by means of a thread (as shown in broken lines in the drawing), whereby insertion of the ring 10 is facilitated and also the possibility provided to replace lost spikes.

A further alternative is shown in FIGS. 8 to 10, in which the ring 10 is omitted by arranging that the downwardly facing surface 12a of the chamber tube 12 and the upwardly facing surface 5a of the main tube 5 are reinforced and the bases of the spikes clamped between these two surfaces. In this connection it is preferable for each two or more adjacent or opposite bases to be rigidly interconnected. In the embodiment the bases form a continuous bridge plate 9b, the advantage of which is that after inserting the chamber tube 12, 12a the spikes arranged in groups can be threaded individually therein, whereupon the main tube 5, 5a is then inserted. Expansion of the whole tire to insert the ring 10 fitted with spikes may thus be dispensed with. The reinforcement of the tube surfaces 5a and 12a as shown in this embodiment extends over the full region of contact.

In this embodiment it is advantageous for the lower end 8d of the spike sleeve 8 to be provided with a thread, the external diameter of which in no larger than the shaft diameter. Tubular members 9a having an internal thread into which the sleeve ends 8d can be screwed are mounted on the bases 9 or the bridge plates 9b.

An asymmetric arrangement is also readily carried out in the manner described above, as shown in FIG. 3. In this case an individual spike 8 on one side opposes a spike group 8e on the other side, for the location of which the bridge plate 9b can be provided with branches 9c. The bridge plates 9b, 9c can also be vulcanised readily in the reinforced region 12a of the chamber tube 12.

The main advantage of the invention thus consists in that the spikes may be extended to any required projection height depending upon the state of the road surface, and that they may also be retracted rapidly without much effort. This increases the road holding on dry or rain-wet roads and simultaneously prevents damage to the road surface. It is of particular advantage that the driver can extend the spikes in the event of a sudden icing of a road section without stopping and use of tools simply by deflating the chamber tube. A further advantage resides in the increased life of the spikes and the possibility of renewal in which only the worn parts 11a of the bushes have to be replaced. Finally, the tire may be provided with a summer tread which, when the road surface is in a normal state, has a far better gripping action especially on flat terrain and may be used an an all-seasons tire because spikes extended to a considerable extent in slush and snow cause a better road gripping action than a normal winter tread.

We claim:

1. A spiked tire for automotive vehicles comprising hard metal pins, pin support means inserted in the tread strip of said tire, each said support means having a sleeve portion and a base portion, each said pin being embedded in one said sleeve portion, each said sleeve portion being slidably mounted in one of a plurality of passages defined in said tread strip, each one of said passages being lined with a bush; at least one radially yieldable concentric ring in the interior of said tire, each said base portion being fastened to one said ring; at least one air chamber between said at least one ring and the inner surface of said tread strip, said at least one ring being thickened and stiff in the region of said base portions and more flexible towards its edges, said edges being connected to the inside surface of said tire.

2. A spiked tire for automotive vehicles comprising hard metal pins; pin support means inserted in the tread strip of said tire, each said support means having a sleeve portion and a base portion, each said pin being embedded in one said sleeve portion, each said sleeve portion being slidably mounted in one of a plurality of passages defined in said tread strip, each one of said passages being lined with a bush; at least one radially yieldable concentric ring in the interior of said tire, each said base portion being fastened to one said ring; a flange located at the inner end of said bush, the inner diameter of said flange corresponding to the diameter of the outer surface of said sleeve portion, said flange having a truncated head; and means for supporting said flange against the inside surface of said bush.

3. A spiked tire for automotive vehicles comprising hard metal pins; pin support means inserted in the tread strip of said tire, each said support means having a sleeve portion and a base portion, each said pin being embedded in one said sleeve portion, each said sleeve portion being slidably mounted in one of a plurality of passages defined in said tread strip, each one of said passages being lined with a bush; at least one radially yieldable concentric ring in the interior of said tire, each said base portion being fastened to one said ring, said bush having a thick wear part and a locating part, said wear part being situated in the region of the wear layer of said tread strip, and means for interchangeably connected said parts.

4. A tire as recited in claim 2, said sleeve portion having a lower part and upper part, means for interchangeably connecting said parts, and means for rigidly mounting said lower part on said base portion.

5. A spiked tire for automotive vehicles comprising hard metal pins; pin support means inserted in the tread strip of said tire, each said support means having a sleeve portion and a base portion, each said pin being embedded in one said sleeve portion, each said sleeve portion being slidably mounted in one of a plurality of passages defined in said tread strip, each one of said passages being lined with a bush; at least one radially yieldable concentric ring in the interior of said tire, each said base portion being fastened to one said ring; and a plate carried within said at least one ring, said base portions being extended laterally to form said plate, said pins being mounted on said plate.

6. A spiked tire for automotive vehicles comprising hard metal pins; pin support means inserted in the tread strip of said tire, each said support means having a sleeve portion and a base portion, each said pin being embedded in one said sleeve portion, each said sleeve portion being slidably mounted in one of a plurality of passages defined in said tread strip, each one of said passages being lined with a bush; at least one radially yieldable concentric ring in the interior of said tire, each said base portion being fastened to one said ring; and a main tube and a chamber tube, said at least one ring being formed by the outwardly facing surface of said main tube and the inwardly facing surface of said chamber tube, said surfaces being reinforced in the region of said bases.

7. A tire as claimed in claim 3, further comprising a flange situated at the inner end of said locating part, the inner diameter of said flange corresponding to the diameter of the outer surface of said sleeve portion.

References Cited

UNITED STATES PATENTS

| | | | |
|---|---|---|---|
| 2,835,302 | 5/1958 | Gedge | 152—208 |
| 2,888,056 | 5/1959 | Zahlten | 152—208 |
| 3,340,921 | 9/1967 | Garfinkle | 152—208 |

ARTHUR L. LA POINT, Primary Examiner